United States Patent
Chen et al.

(10) Patent No.: US 10,141,026 B1
(45) Date of Patent: Nov. 27, 2018

(54) ACCESS CONTROL FOR HARDWARE RESOURCES

(71) Applicant: INTERNATIONAL BUSINESS MACHINES CORPORATION, Armonk, NY (US)

(72) Inventors: Fei Chen, Beijing (CN); Junsong Wang, Beijing (CN); Chao Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/730,110

(22) Filed: Oct. 11, 2017

(51) Int. Cl.
G06F 7/38 (2006.01)
H03K 19/177 (2006.01)
G11B 27/10 (2006.01)
G06F 12/14 (2006.01)
G06F 17/30 (2006.01)
G06F 9/46 (2006.01)

(52) U.S. Cl.
CPC ............ *G11B 27/102* (2013.01); *G06F 9/468* (2013.01); *G06F 12/1458* (2013.01); *G06F 17/30433* (2013.01); *H03K 19/17748* (2013.01); *H03K 19/17776* (2013.01)

(58) Field of Classification Search
CPC ............ G06F 11/1004; G06F 13/4282; G06F 15/7867; G06F 3/0416; G06F 2009/45579; G06F 9/50; G06F 21/629; G06F 9/445; H03K 19/17748; H03K 19/1776; H03K 19/17776; H03K 19/17756; H03K 19/17768; H04W 12/08; H04W 40/248; H04L 47/70; H04L 63/20
See application file for complete search history.

(56) References Cited

U.S. PATENT DOCUMENTS

| | | | |
|---|---|---|---|
| 8,341,469 B2 | 12/2012 | Miyama et al. | |
| 9,059,705 B1 | 6/2015 | Edelhaeuser | |
| 9,491,112 B1* | 11/2016 | Patel | H04L 47/70 |
| 9,547,485 B2* | 1/2017 | Suzuki | G06F 8/61 |
| 9,864,636 B1* | 1/2018 | Patel | G06F 9/4881 |
| 9,959,157 B1* | 5/2018 | Adogla | G06F 11/079 |

(Continued)

FOREIGN PATENT DOCUMENTS

| | | |
|---|---|---|
| CN | 103677868 A | 3/2014 |
| CN | 104636290 A | 5/2015 |

OTHER PUBLICATIONS

Mell et al., "The NIST Definition of Cloud Computing," U.S. Department of Commerce, National Institute of Standards and Technology, Sep. 2011, p. 1-7, Special Publication 800-145.

(Continued)

*Primary Examiner* — Vibol Tan
(74) *Attorney, Agent, or Firm* — Dmitry Paskalov

(57) ABSTRACT

According to a method, an access request for a configuration module in a Field Programmable Gate Array (FPGA) may be received. The configuration module may be operable to configure functionality of the FPGA based on configuration information stored thereon. It may be determined whether the access request conforms to a specification specifying access control related to the configuration module. In response to determining that the access request conforms to the specification, the access request may be transmitted to the configuration module for access of the configuration information.

20 Claims, 7 Drawing Sheets

(56) References Cited

U.S. PATENT DOCUMENTS

2008/0304090 A1* 12/2008 Shimmoto .............. G06F 9/485
358/1.13
2013/0049801 A1 2/2013 Sun
2016/0119358 A1* 4/2016 Laadan ................... H04L 63/20
726/28
2017/0064097 A1* 3/2017 Yamamoto ....... H03K 19/17748

OTHER PUBLICATIONS

Machidon et al., "Remote SoC/FPGA Platform Configuration for Cloud Applications", 2014 International Conference on Optimization of Electrical and Electronic Equipment (OPTIM), May 22-24, 2014, Bran, Romania, copyright 2014 IEEE, pp. 827-832.

* cited by examiner

ACCESS CONTROL FOR HARDWARE RESOURCES

BACKGROUND

The present disclosure relates to access control, and more specifically, to access control for hardware resources. Computing capacity requirement increases as cognitive computing, artificial intelligence (AI), big data, computationally intensive applications and the like become popular. However, general-purpose processors are unable to meet the increasingly growing requirement of the computing capacity. In this case, more powerful hardware accelerators, such as Field Programmable Gate Arrays (FPGAs), have been developed for use in the environment with a heavy demand on the computing capacity, such as the cloud computing environment. However, conventional designs for hardware accelerators are insufficient to guarantee the security of the hardware accelerators.

SUMMARY

According to one embodiment of the present disclosure, there is provided a method. According to the method, an access request for a configuration module in an FPGA may be received. The configuration module may be operable to configure functionality of the FPGA based on configuration information stored thereon. It may be determined whether the access request conforms to a specification specifying access control related to the configuration module. In response to determining that the access request conforms to the specification, the access request may be transmitted to the configuration module for access of the configuration information.

According to another embodiment of the present disclosure, there is provided an FPGA. The FPGA may include a configuration module operable to configure functionality of the FPGA based on configuration information stored thereon. The FPGA may also include a specification module operable to: receive an access request for the configuration module, determine whether the access request conforms to a specification specifying access control related to the configuration module, and in response to determining that the access request conforms to the specification, transmit the access request to the configuration module for access of the configuration information.

According to yet another embodiment of the present disclosure, there is provided a system. The system may include one or more processors and a memory coupled to at least one of the processors. A set of computer program instructions may be stored in the memory and executed by at least one of the processors in order to perform actions of: receiving an access request for a configuration module in an FPGA, the configuration module being operable to configure functionality of the FPGA based on configuration information stored thereon; determining whether the access request conforms to a specification specifying access control related to the configuration module; and in response to determining that the access request conforms to the specification, transmitting the access request to the configuration module for access of the configuration information.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Moreover, it is to be understood that in the context of the present disclosure, the terms "first," "second," "third" and the like are used to indicate individual elements or components, without suggesting any limitation as to the order of these elements. Further, unless otherwise indicated, a first element may or may not be the same as a second element. Other definitions, explicit and implicit, may be included below.

Figure 1:
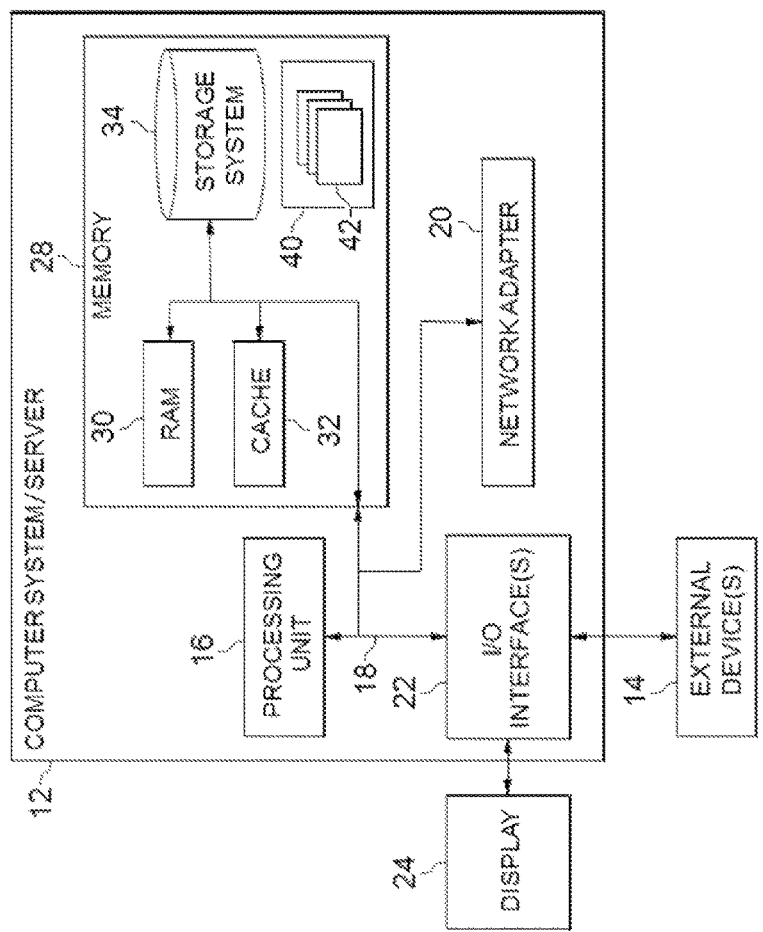
FIG. 1 shows an example computer system which is applicable to implement the embodiments of the present disclosure.

Reference is first made to FIG. 1, in which an example computer system/server 12 which is applicable to implement the embodiments of the present disclosure is shown. FIG. 1 is also adapted to depict an illustrative example of a portable electronic device such as a communication device which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
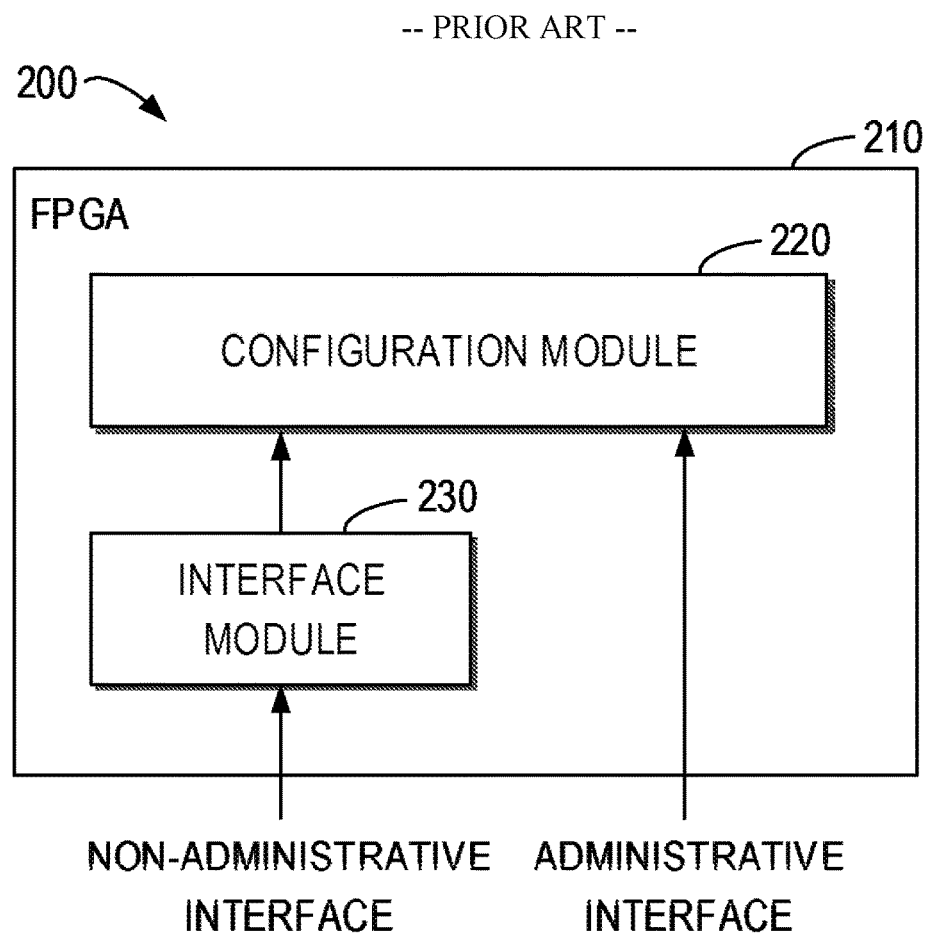
FIG. 2 shows a schematic diagram of a conventional hardware accelerator architecture.

As mentioned above, the conventional hardware accelerator design, such as the FPGA design, is insufficient to guarantee the security of the hardware accelerator. An example of the conventional hardware accelerator architecture 200 is shown in FIG. 2. The conventional hardware accelerator architecture 200 includes an FPGA 210. Hereinafter, the FPGA is described as an example of the hardware accelerator. However, it is to be understood that examples of the hardware accelerator are not limited to the FPGA, but may include any hardware devices that are capable of performing acceleration, such as an Application Specific Integrated Circuit (ASIC).

The FPGA 210 is an integrated circuit that is configurable by the user after being manufactured. The FPGA 210 may serve as the processing unit 16 shown in FIG. 1. As shown in FIG. 2, the FPGA 210 includes a configuration module 220 and an interface module 230. The configuration module 220 is operable to configure functionality of the FPGA 210 based on configuration information stored thereon. Typically, the configuration information is specified using a hardware description language (HDL). In other cases, any other machine-readable languages may be used to specify the configuration information.

Specifically, the configuration module 220 may configure, based on the configuration information, the logical behaviors of all or some of the logic cells (not shown) in the FPGA 210 to implement the functionality of the FPGA 210. A logic cell is the smallest functional unit of the FPGA. Each logic cell may contain a lookup table (LUT) to implement a combinational logic and a flip-flop, which stores the output of the LUT, to implement the sequential logic. The LUT can encode any n-input Boolean function by storing the truth table of the function into the LUT, where n is an integer larger than one. This is an efficient way of encoding Boolean logic functions, and providing reconfigurable hardware logic capabilities for the FPGA. As an example, in order to implement an AND gate function, the truth table stored in the LUT may be as shown in Table 1:

TABLE 1

| Input 1 | Input 2 | Output |
|---------|---------|--------|
| 0 | 0 | 0 |
| 0 | 1 | 0 |
| 1 | 0 | 0 |
| 1 | 1 | 1 |

Additionally, the configuration module 220 may also configure, based on the configuration information, the properties of all or some of the pins (not shown) of the FPGA in order to implement the functionality of the FPGA 210. For example, the configuration module 220 may configure a pin to a certain logic level (such as a logic low level, a logic high level, or a high resistance level), or may configure the pin as an input pin or an output pin.

The FPGA 210 may receive, from an administrative interface, such as a Joint Test Action Group (JTAG) interface, an access request for the configuration module 220 to access the configuration information stored thereon. The access request may be an operation for reading configuration information from the configuration module 220 and/or writing configuration information to the configuration module 220.

Alternatively, the FPGA 210 may also receive, from a non-administrative interface, an access request for the configuration module 220 to access the configuration information. The non-administrative interface may be a Universal Serial Bus (USB) interface, a Peripheral Component Interconnect Express (PCIe) interface, an Ethernet interface, and/or the like.

Different from the access request which is received from the administrative interface which is directly transmitted to the configuration module 220, the access request received from the non-administrative interface is first transmitted to the interface module 230. The interface module 230 may convert the access request received from the non-administrative interface into a format suitable for the configuration module 220, and then transmit the converted access request to the configuration module 220.

In conventional hardware accelerator architectures, such as the architecture 200, there is no access control for the received access requests. For example, when a user programs the FPGA by accessing the configuration information stored in the configuration module in a cloud computing environment, a cloud provider may be required to provide full control of the FPGA to the user. With the full control, any types of access requests may be issued by the user to the FPGA. However, due to the unawareness of the user in the configuration of the FPGA, or due to the misoperation or malicious operation of the user on the configuration module, the FPGA may be misconfigured. For example, a harmful configuration file may be downloaded to the configuration module, and thus bringing the FPGA into a dangerous state. Therefore, the lack of access control in the hardware accelerator architecture results in disastrous security problems.

Moreover, since the FPGA may interact directly with the external circuits of a Printed Circuit Board (PCB) containing the FPGA, such as circuits for Double Data Rate (DDR), USB and PCIe, the misconfigured FPGA may also damage these external circuits, the PCB, or even the host machine hosting the PCB. As an example, if the configuration of the FPGA does not match the circuits to which the FPGA connects, the PCB may be damaged. Specifically, if a pin of the FPGA is electrically connected to a logic high level (such as, 3.3V), but the user configures in the access request the pin to an inverse logic level, that is, a logic low level (such as, GND), such configuration will cause a short circuit accident and thus damage that pin or the FPGA.

Typically, an FPGA vendor has full knowledge of the FPGA only and a service provider (such as the cloud provider) has full knowledge of the hardware environment. Due to the knowledge limitation, neither the FPGA vendor nor the service provider can perform access control for the FPGA. In particular with only the knowledge of the FPGA but without any knowledge about how the FPGA is used in the hardware environment, the FPGA vendor cannot specify the allowable or restricted configuration in the hardware environment. For example, although the FPGA vendor knows about the prescribed logic levels of the pins of the FPGA, the FPGA vendor is unable to constrain the logic levels to which the pins are actually connected in field. Thus, the FPGA vendor is only able to perform the security check for the internal circuits within the FPGA, but is unable to perform the security check based on the hardware environment.

On the other hand, although the cloud provider has full knowledge of the hardware environment, the cloud provider is unable to constrain how the user programs the FPGA for the purpose of preserving security for the FPGA. Typically, configuration information stored in the configuration module of the FPGA may be of a private format which is not public to the cloud provider. In this case, the cloud provider fails to control, for example, how the user configures the logic levels of the pins of the FPGA, and thus is unable to prevent the pins from connecting to incorrect logic levels.

A partial reconfiguration technology has been proposed to implement some kind of access control in the FPGA. The partial reconfiguration is the process of changing a part of the FPGA without affecting the other parts. For example, the user may configure a reconfigurable area of the FPGA without affecting the logic levels of the pins outside that area. However, even with the partial reconfiguration technology, it is unable to constrain the user to only configure a specific area of the FPGA. The user may still be able to configure other areas of the FPGA, for example, by downloading a full configuration file for configuring the overall functionality of the FPGA into the configuration module.

Embodiments of the present disclosure provide a new solution for access control for hardware resources is proposed. According to the solution, a specification module is introduced to perform access control for a configuration module of an FPGA. The specification module is operable to determine whether an access request destined for the configuration module conforms to specific predefined criterion and decide whether to transmit the access request to the configuration module based on the determination. Through the solution, it is possible to achieve access control of the FPGA by providing access requests that conform to the predefined specification only to the configuration module.

Figure 3:
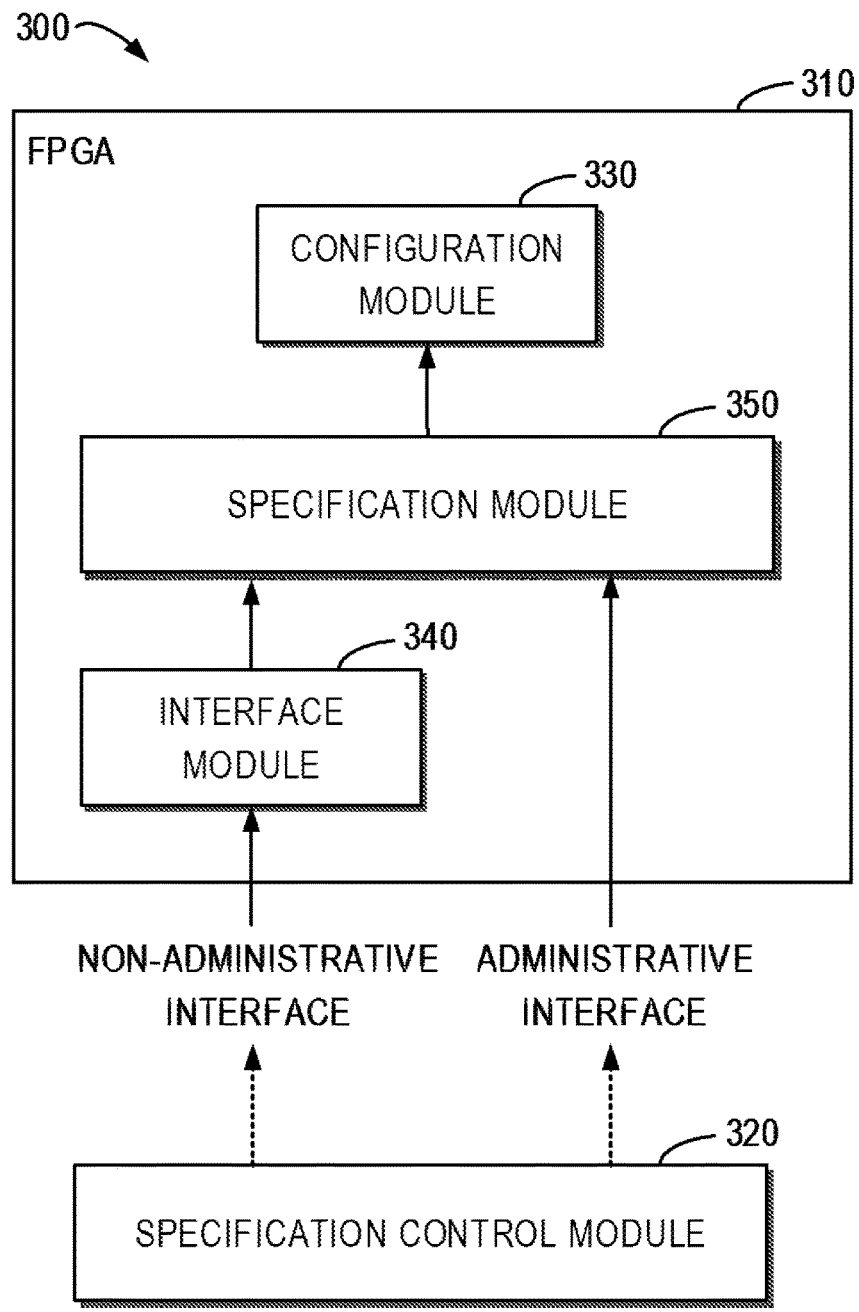
FIG. 3 shows a schematic diagram of an example hardware accelerator architecture in accordance with embodiments of the present disclosure.

FIG. 3 shows a schematic diagram of an example hardware accelerator architecture 300 in accordance with embodiments of the present disclosure. It should be understood that the structure and function of the hardware accelerator architecture 300 shown in FIG. 3 is for purpose of illustration and does not imply any limitation on the scope of the present disclosure. Embodiments of the present disclosure may be embodied in different structures and/or functions.

The hardware accelerator architecture 300 includes an FPGA 310 and a specification module 320. The FPGA 310 may serve as the processing unit 16 shown in FIG. 1. As shown in FIG. 3, the FPGA 310 includes a configuration module 330 and an interface module 340.

The configuration module 330 is operable to configure functionality of the FPGA 310 based on configuration information stored thereon. Typically, the configuration information is specified using a hardware description language (HDL). In other cases, any other machine-readable languages may be used to specify the configuration information. Specifically, the configuration module 330 may configure, based on the configuration information, the logical behaviors of all or some of the logic cells (not shown) in the FPGA 310 to implement the functionality of the FPGA 310. Additionally, the configuration module 330 may also configure, based on the configuration information, the properties of all or some of the pins (not shown) of the FPGA in order to implement the functionality of the FPGA 310.

The interface module 340 may convert the access request received from the non-administrative interface into a format suitable for the configuration module 330, and then transmit the converted access request to the configuration module 330.

In addition to the configuration module 330 and the interface module 340, the FPGA 310 further includes a specification module 350. The specification module 350 may be implemented in a non-volatile storage that is either one-time programming or multi-time programming. Other storage implementations of the specification module 350 are also possible. In the example of FIG. 3, the specification module 350 is built in the FPGA 310. However, the arrangement of the specification module 350 may be varied and an alternative arrangement will be discussed below with reference to FIG. 4.

Still referring to FIG. 3, the specification module 350 may store a specification specifying access control related to the configuration module 330. Specifically, the specification may specify the access control for at least one of the following: one or more interfaces from which the access request to the configuration module 330 is received, one or more users attempting to access the configuration module 330, and/or part or all of the configuration information stored in the configuration module 330. Now some examples of the specification contained in the specification module 350 will be discussed.

Access control for an interface.

In some embodiments, the specification may specify different privileges for one or more interfaces of the FPGA 310 from which the access request for the configuration module 330 may be received. In this way, the access control can be achieved based on the privileges of the interfaces. For example, since the administrative interface is generally used by a user with high privilege, such as an administrator, the administrative interface may be assigned with a higher privilege above a non-administrative interface(s). In this case, the access request received from the administrative interface may be accepted for transmission to the configuration module 330, but the access request received from the non-administrative interface may be discarded.

Access control for a user.

In some embodiments, the specification may specify different privileges for one or more users. For example, an administrator may be assigned with a higher privilege above a normal user. In this case, the access request issued by the administrator may be accepted for transmission to the configuration module 330, but the access request issued by the normal user may be discarded. Alternatively, or in addition, the specification may contain user credentials or keys. In this case, the access request from a normal user who also provides a user credential or key that match the user credential or key contained in the specification may also be accepted for transmission to the configuration module 330.

Access control for the configuration information.

The specification may specify the access control for part or all of the configuration information for one or more pins and/or logic gates of the FPGA 310. In the embodiments of access control for the pins, the specification may specify allowable properties for one or more pins in the configuration information. Specifically, the specification may specify the allowable level standard for a given pin (such as TTL, LVTTL, CMOS or the like). Alternatively, or in addition, the specification may specify an allowable logic level for one or more pins. For example, the specification may specify whether a pin is allowable to be set to a logic low level, a logic high level, a high resistance level, or the like. In some other embodiments, the specification may specify an allowable I/O state for one or more pins. For example, the specification may specify whether a pin is allowable to be set as an input pin or an output pin. In this case, the configuration information of the properties of a pin(s) may be locked to the specified allowable pin states, such that the access request that intends to change the configuration information for the pin(s) to the unallowable states will be denied.

Although the access control has been described with respect to the interface, the user and the configuration information, respectively, the access control can be specified for any combination of the interface, the user and the configuration information.

In the embodiments of access control for the logic gates of the FPGA 310, the specification may specify that configuration information of certain logic gates is accessible to certain users. In this way, the configuration information of the logic gates is locked for access requests from the specified users. Specifically, the specification may specify that the configuration information of the logic gates of an encryption area may be allowed to be accessed by a first user, and the configuration information of the logic gates of an image decoding area may be allowed to be accessed by a second user. In this way, the configuration information for the logic gates of the encryption area is locked to be accessed by the first user, while the configuration information for the logic gates of the image decoding area are locked to be accessed by the second user.

In some embodiments, the configuration information for the logic gates may be locked by addresses of the logic gates, either physical addresses or logical addresses in the configuration module 330. For example, the encryption area may include the logic gates of the addresses 0-99, and the image encoding area may include the logic gates of the addresses 100-149. In this case, the specification may specify that the configuration information for the logic gates of the addresses 0-99 may be allowed to be accessed by the first user, and the configuration information for the logic gates of the addresses 100-149 may be allowed to be accessed by the second user. Note that the values of the above addresses are illustrative, and do not intend to limit the scope of the present disclosure.

As mentioned above, the FPGA 310 may receive, from the administrative interface or the non-administrative interface, an access request for the configuration module 330 to access the configuration information. The access request may be an operation for reading the configuration information from the configuration module 330 and/or writing the configuration information in the configuration module 330.

The specification module 350 may determine whether the received access request conforms to the specification. Specifically, the specification module 350 may determine whether the access request conforms to the specification based on at least one of the following: the interface of the FPGA 310 from which the access request is received, the user issuing the access request, and the part of the configuration information in the configuration module 330 to be accessed. In response to determining that the access request conforms to the specification, the specification module 350 may transmit the access request to the configuration module 330 to access the configuration information. Otherwise, the specification module 350 may discard the access request.

Some examples of the specification have been discussed above. The determination in the specification module 350 based on the specification will be described in detail below.

Determination based on the interface.

In some embodiments, the specification module 350 may perform the determination based on the access control for the interface specified in the specification. For example, the specification module 350 may perform the determination based on whether the interface has a predetermined privilege. As described above, the administrative interface may be assigned with a higher privilege above the non-administrative interface. In this case, the specification module 350 may determine that the access request received from the administrative interface may be accepted because it conforms to the specification and thus may be transmitted to the configuration module. The access request received from the non-administrative interface may be determined as failing to conform to the specification and thus will be discarded.

Determination based on the user.

In some embodiments, the specification module 350 may perform the determination based on the access control for the user specified in the specification. For example, the specification module 350 may perform the determination based on whether the user has a predetermined privilege. As described above, the administrator may have a higher privilege above the normal user. In this case, the specification module 350 may determine that the access request issued by the administrator may be accepted because it conforms to the specification and thus may be transmitted to the configuration module. The access request from the normal user may be determined as failing to conform to the specification and thus will be discarded.

Determination based on the configuration information.

In some embodiments, the specification module 350 may perform the determination based on the access control for the part of configuration information for the pins of the FPGA specified in the specification. For example, in the case that the specification specifies that the configuration information of a pin is allowed to be set to a logic high level, that is, the pin is locked to the logic high level, the specification module 350 may determine that the access request attempting to set the configuration information of the pin to a logic low level in the configuration information 210 fails to conform to the specification and thus will be discarded.

Alternatively, or in addition, in some embodiments, the specification module 350 may perform the determination based on the access control for the part of configuration information for the logic gates of the FPGA. For example, in the case that the specification specifies that the configuration information for the logic gates of the addresses 0-99 are allowed to be accessed by the first user, the access request from the second user attempting to access the configuration information for the logic gates of the addresses 0-99 will be discarded.

Although the determination has been described with respect to the interface, the user, and the configuration information respectively, the determination can be made based on any combination of the interface, the user and the configuration information.

In some embodiments, if the access request is determined to be discarded, the specification module 350 may generate an alert message to notify the user that the access request has been denied.

By employing the specification specifying the access control related to the configuration module 330, it is possible to eliminate the misconfiguration of the hardware resources which could easily damage the hardware or even cause serious disasters. In addition, hardware resource sharing can be achieved in the multi-user environment with security for such sharing guaranteed in the meantime.

In order to provide more flexibility to the hardware accelerator architecture 300, in some embodiments, a specification control module 320 is provided to set/modify the specification. In some embodiments, as shown in FIG. 3, the specification control module 320 may be built outside the FPGA 310.

In some embodiments, the specification control module 320 may transmit, to the specification module 350, access control information for setting the specification via the interfaces of the FPGA 310. In response to receiving the access control information, the specification module 350 may set the specification based on the access control information. For example, the specification may originally specify that the configuration information of a pin is locked to a logic high level, and the specification control module 320 may provide the access control information for modifying the specification, such that the modified specification may specify that the configuration information of the pin may be a logic low level or a high resistance level.

In some embodiments, the specification module 350 may determine whether the access control information received from the specification control module 320 can be used to set its specification. The determination of setting the specification may be based on the interface from which the access control information is received, and/or the user who prescribing the access control information.

In an embodiment, the specification module 350 may determine whether the interface of the FPGA has a predetermined privilege for setting the specification. As described above, the administrative interface may be assigned with a higher privilege above the non-administrative interface. In this case, the specification module 350 may determine that the access control information received from the administrative interface may be used to set the specification, but the access control information received from the non-administrative interface may not be used. As another example, the specification module 350 may determine that the access control information received from the administrative interface may be used to set the whole specification, but the access control information received from the non-administrative interface may only be used to set a certain part of the specification.

In another embodiment, the specification module 350 may determine whether the user of from whom the access request is issued has a predetermined privilege for setting the specification. As described above, the administrator may have a higher privilege above the normal user. In this case, the specification module 350 may determine that the access control information provided by the administrator may be used to set the specification, but the access control information provided by the normal user may not be used. As another example, the specification module 350 may determine that the access control information provided by the administrator may be used to set the whole specification, but the access control information provided by the normal user may only be used to set a certain part of the specification.

As an alternative, or in addition to the access control information, privilege information, such as user credentials or keys, may be provided or obtained from the specification control module 320 to the specification module 350. In this case, the specification module 320 may check the provided user credentials or keys against the user credentials or keys stored in the specification module 350, such that the specification may only be set by the authorized users.

For example, in the case that the specification control module 320 provides or allows to obtain the access control information along with the privilege information to the specification module 350 via the non-administrative interface, even if the non-administrative interface is of low privilege, the specification module 350 may also set the specification based on the access control information.

Optionally, in the event that the specification module 350 refuses to set the specification based on the access control information, the specification module 350 may also generate an alert message to notify the user that the setting of the specification has been refused.

Figure 4:
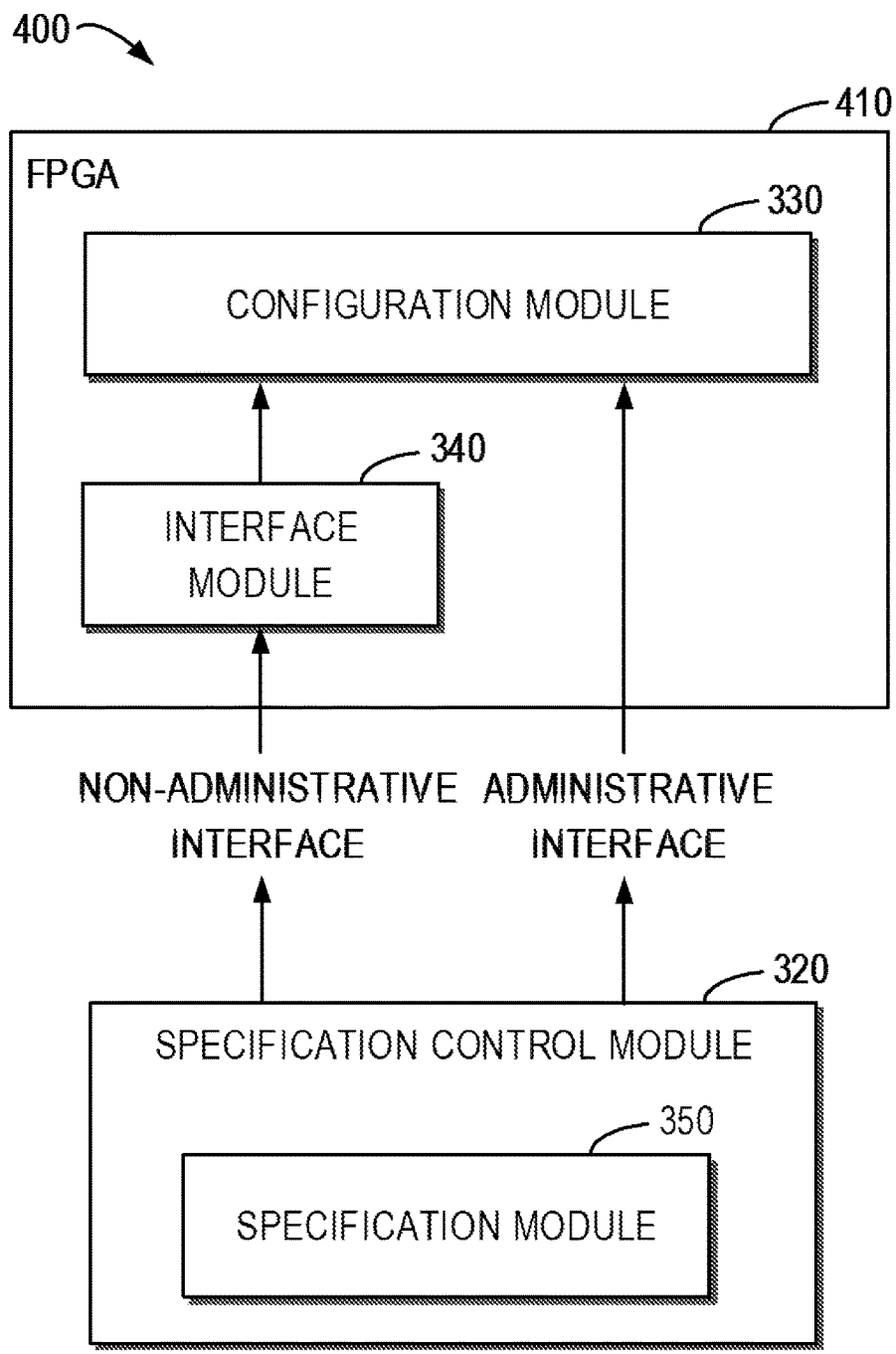
FIG. 4 shows a schematic diagram of another example hardware accelerator architecture in accordance with embodiments of the present disclosure.

FIG. 4 shows a schematic diagram of another example hardware accelerator architecture 400 in accordance with embodiments of the present disclosure. It should be understood that the structure and function of the hardware accelerator architecture 400 shown in FIG. 4 is for illustrative purposes only and does not imply any limitation on the scope of the present disclosure. Embodiments of the present disclosure may be embodied in different structures and/or functions.

The hardware accelerator architecture 400 includes an FPGA 410 and a specification control module 320. The FPGA 410 may be implemented in the computer system/server 12. As shown in FIG. 4, the FPGA 410 includes the configuration module 330 and the interface module 340. The functions of the configuration module 330 and the interface module 340 are substantially the same as those described with reference to FIG. 3 and thus details thereof are omitted for sake of brevity.

Different from the FPGA 310 shown in FIG. 3, a specification module 350 is set in the external specification control module 320, rather than in the FPGA 410. In this way, no change needs to be made to the FPGA 410 while access control for the configuration module 330 can still be achieved.

In the example of FIG. 4, the access request destined for the configuration module 330 in the FPGA 410 is first received by the specification module 350. The specification module 350 performs the same function of access control to the access request as in the example of FIG. 3. If the specification module 350 determines that the access request conforms to the specification, the specification module 350 transmits the access request to the configuration module 330 to access the configuration information either via the administrative interface or the non-administrative interface of the FPGA 410. Otherwise, in response to determining that the access request fails to conform to the specification, the specification module 350 discards the access request.

In order to set/modify the specification, the specification control module 320 may provide the specification module 350 with the access control information to set the specification based on the access control information.

In some embodiments, as described above, the specification module 350 may determine whether the user and/or the interface of the FPGA have a predetermined privilege for setting the specification. Also, in the case that the specification control module 320 provides the privilege information, the specification module 320 may check the provided privilege information against the privilege information stored in the specification module 350, such that the specification may only be set by the authorized users.

Optionally, in the event that the specification module 350 refuses to set the specification based on the access control information, the specification module 350 may also generate an alert message to notify the user that the setting of the specification has been refused.

In this way, similar to FIG. 3, it is possible to eliminate the misconfiguration of the hardware resources which could easily damage the hardware or even cause serious disasters, and secure hardware resource sharing can be achieved in the multi-user environment. Additionally, since no change needs to be made to the FPGA 410, the hardware accelerator architecture 400 provides more flexibility.

Figure 5:
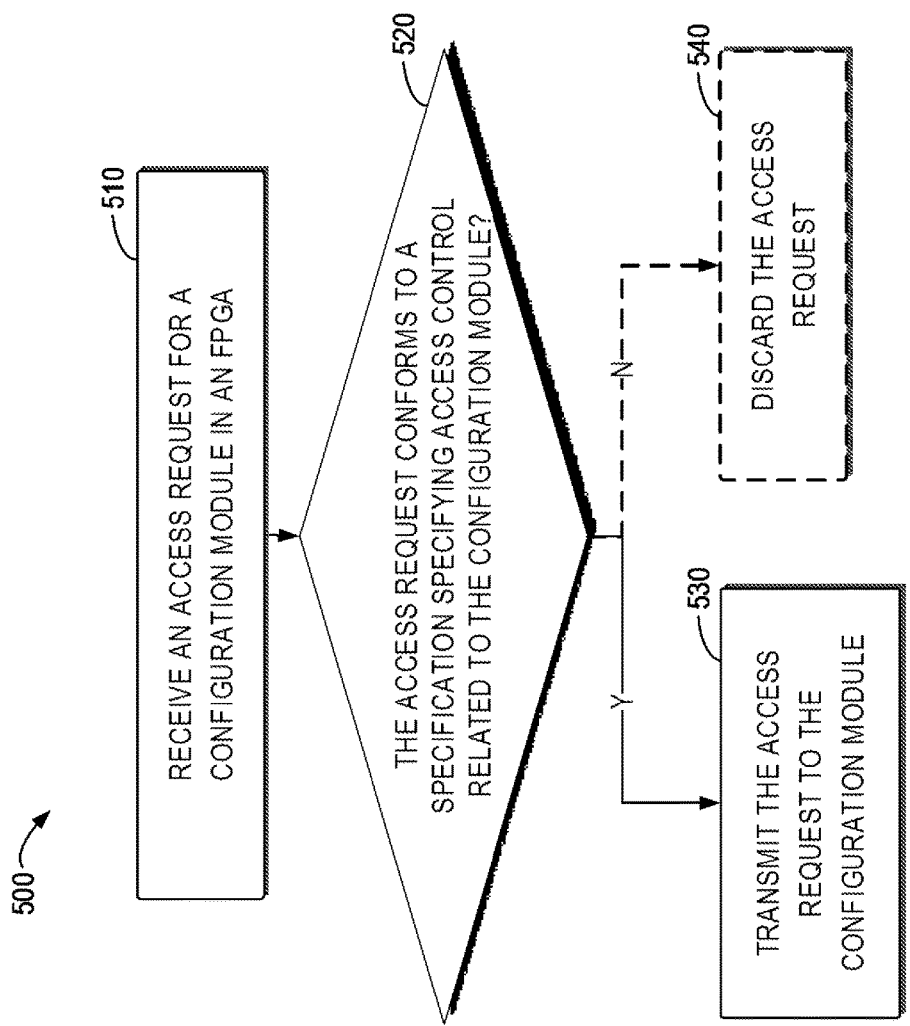
FIG. 5 is a flow chart of a method implemented in the example hardware accelerator architecture in accordance with embodiments of the present disclosure.

FIG. 5 is a flow chart of a method 500 implemented in the example hardware accelerator architecture 300 or 400 in accordance with embodiments of the present disclosure. The method 500 is entered in block 510, where the specification module receives an access request for the configuration module 330 in the FPGA 310 or 410.

In block 520, the specification module 350 determines whether the access request conforms to a specification specifying access control related to the configuration module 330. In some embodiments, whether the access request conforms to the specification is determined based on at least one of the following: an interface of the FPGA 310 or 410 from which the access request is received, a user issuing the access request, and part of the configuration information in the configuration module 330 to be accessed. For example, the part of configuration information includes at least one of the following: part of configuration information for a pin of the FPGA 310 or 410 and part of configuration information for a logic gate of the FPGA 310 or 410.

In block 530, in response to determining that the access request conforms to the specification, the specification module 350 transmits the access request to the configuration module 330 for access of the configuration information. In block 540, in response to determining that the access request fails to conform to the specification, the specification module 350 discards the access request.

In this way, the misconfiguration of the hardware resources which could easily damage the hardware or even cause serious disasters can be avoided.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored thereon comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative embodiments, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
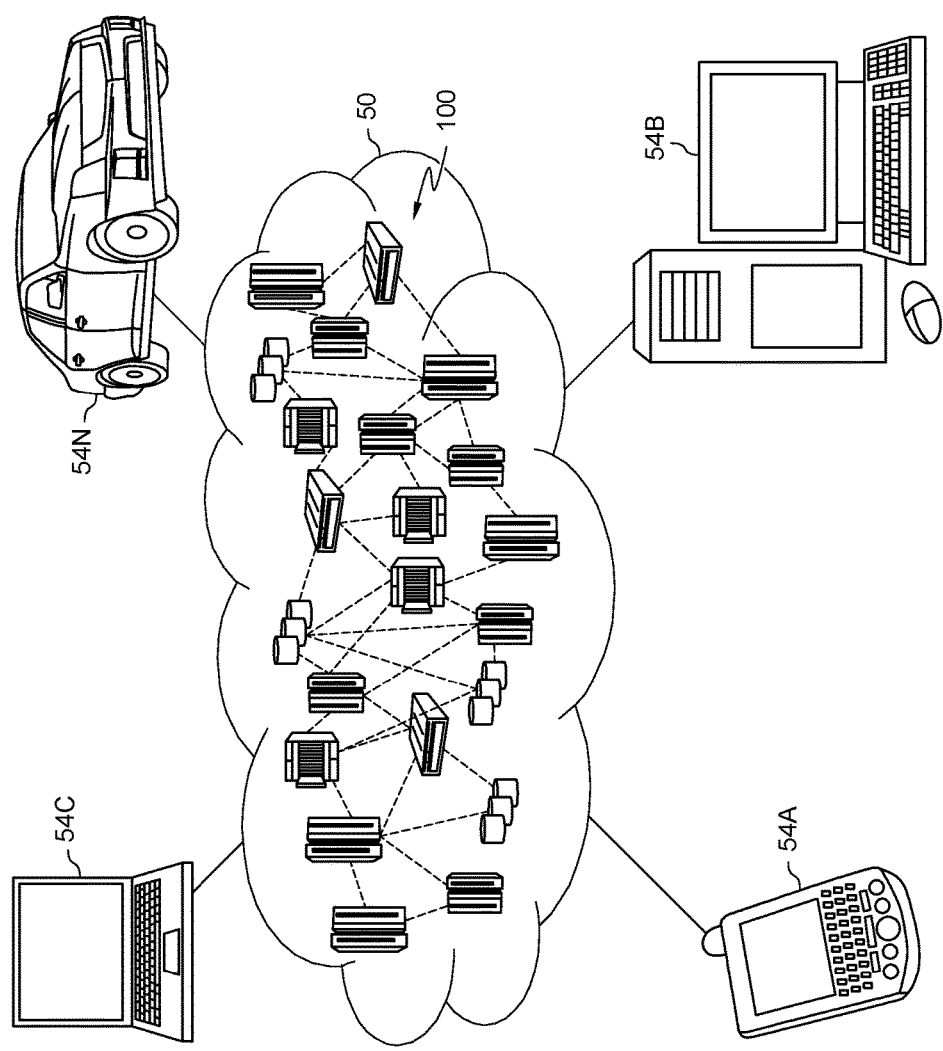
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
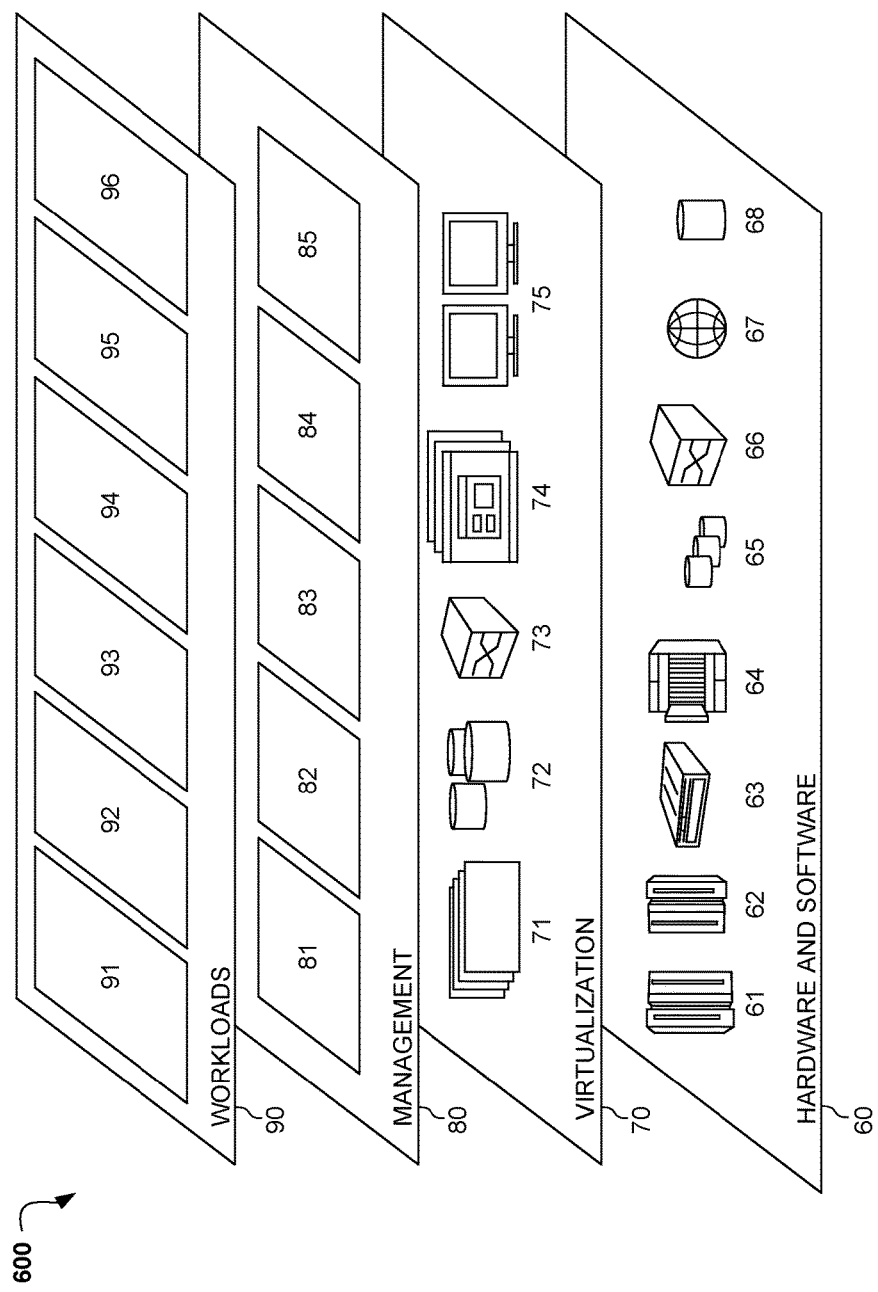
FIG. 7 depicts abstraction model layers according to an embodiment of the present invention.

Referring now to FIG. 7, a set of functional abstraction layers 500 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and access control for hardware resources 96. Access control for hardware resources 96 may relate to a configuration module in a Field Programmable Gate Array (FPGA). The configuration module may be operable to configure functionality of the FPGA based on configuration information stored thereon. The configuration module may determine whether the access request conforms to a specification specifying access control related to the configuration module. In response to determining that the access request conforms to the specification, the access request may be transmitted to the configuration module for access of the configuration information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving an access request for a configuration module in a Field Programmable Gate Array (FPGA), the configuration module being operable to configure functionality of the FPGA based on configuration information stored thereon;
determining whether the access request conforms to a specification specifying access control related to the configuration module; and
in response to determining that the access request conforms to the specification, transmitting the access request to the configuration module for access of the configuration information.

2. The method of claim 1, further comprising:
in response to determining that the access request fails to conform to the specification, discarding the access request.

3. The method of claim 1, wherein determining whether the access request conforms to the specification comprises:
determining whether the access request conforms to the specification based on at least one of the following:
an interface of the FPGA from which the access request is received,
a user issuing the access request, and
a part of the configuration information to be accessed.

4. The method of claim 3, wherein the part of configuration information includes at least one of the following: a part of configuration information for a pin of the FPGA, and a part of configuration information for a logic gate of the FPGA.

5. The method of claim 1, further comprising:
obtaining access control information from a device external to the FGPA; and
setting the specification based on the access control information.

6. The method of claim 5, wherein the access control information is received via an interface of the FPGA.

7. The method of claim 6, wherein setting the specification based on the access control information comprises:
determining whether the interface of the FPGA has a predetermined privilege; and
in response to determining that the interface of the FPGA has the predetermined privilege, setting the specification based on the access control information.

8. The method of claim 5, wherein setting the specification based on the access control information comprises:
determining whether a user from whom the access request is issued has a predetermined privilege; and
in response to determining that the user has the predetermined privilege, setting the specification based on the access control information.

9. A Field Programmable Gate Array (FPGA), comprising:
a configuration module operable to configure functionality of the FPGA based on configuration information stored thereon; and
a specification module operable to:
receive an access request for the configuration module,
determine whether the access request conforms to a specification specifying access control related to the configuration module, and
in response to determining that the access request conforms to the specification, transmit the access request to the configuration module for access of the configuration information.

10. The FPGA of claim 9, wherein the specification module is further operable to:
in response to determining that the access request fails to conform to the specification, discard the access request.

11. The FPGA of claim 9, wherein the specification module is operable to:
determine whether the access request conforms to the specification based on at least one of the following:
an interface of the FPGA from which the access request is received,
a user issuing the access request, and
a part of the configuration information to be accessed.

12. The FPGA of claim 11, wherein the part of configuration information includes at least one of the following: a part of configuration information for a pin of the FPGA, and a part of configuration information for a logic gate of the FPGA.

13. The FPGA of claim 9, wherein the specification module is further operable to:
obtain access control information from a device external to the FGPA; and
set the specification based on the access control information.

14. The FPGA of claim 13, wherein the access control information is received via an interface of the FPGA.

15. The FPGA of claim 14, wherein the specification module is operable to:
determine whether the interface of the FPGA has a predetermined privilege; and
in response to determining that the interface of the FPGA has the predetermined privilege, set the specification based on the access control information.

16. The FPGA of claim 13, wherein the specification module is operable to:
determine whether a user from whom the access request is issued has a predetermined privilege; and
in response to determining that the user has the predetermined privilege, set the specification based on the access control information.

17. The FPGA of claim 14, wherein the interface of the FPGA include one of the following:
an administrative interface, and
a non-administrative interface.

18. The FPGA of claim 17, wherein the administrative interface includes a Joint Test Action Group (JTAG) interface.

19. The FPGA of claim 17, wherein the non-administrative interface includes at least one of: a Universal Serial Bus (USB) interface, a Peripheral Component Interconnect Express (PCIe) interface, an Ethernet interface.

20. A computer program product, the computer program product comprising a non-transitory computer readable storage medium having program instructions loaded into the computer storage medium, the program instructions executable by a device to cause the device to:
  receive an access request for a configuration module in a Field Programmable Gate Array (FPGA), the configuration module being operable to configure functionality of the FPGA based on configuration information stored thereon;
  determine whether the access request conforms to a specification specifying access control related to the configuration module; and
  in response to determining that the access request conforms to the specification, transmit the access request to the configuration module for access of the configuration information.

* * * * *